Patented June 29, 1948

2,444,328

UNITED STATES PATENT OFFICE 2,444,328

COMPOSITION OF MATTER

Charles M. Blair, Jr., Webster Groves, Mo., assignor to Petrolite Corporation, Ltd., Wilmington, Del., a corporation of Delaware No Drawing. Original application December 31, 1943, Serial No. 516,536. Divided and this application September 12, 1945, Serial No. 615,913

10 Claims. (Cl. 260—404.8)

The present invention relates to a new class of chemical substances and more particularly to new reagents which are useful as lubricating oil additives, rust preventive compounds and for other purposes hereinafter described. This application is a division of abandoned application Serial No. 516,536, filed December 31, 1943, which is in turn a continuation-in-part of my earlier application Serial No. 461,035, filed October 6, 1942, now Patent No. 2,342,113, February 22, 1944.

Briefly, this new class of chemical compounds may be described as consisting of esters derived by an esterification reaction between a high molecular weight alcohol and a polybasic carboxy acid or anhydride of the kind hereinafter described.

The alcohols contemplated as reactants in preparing the present compounds are the high molecular weight alkyl, aralkyl, and alicyclic alcohols in which there is present at least one alkyl residue containing at least eight and not more than thirty-two carbon atoms.

The polybasic acids or anhydrides contemplated as reactants for production of this new class of compounds are obtained by the condensation of an alpha-beta ethylenic carboxy acid or anhydride with an unsaturated, nonhydroxylated fatty acid containing from ten to twenty-four carbon atoms in its carbon chain. The desired polybasic acid or anhydride reactants may be prepared by two different types of reaction. One type of reaction involves the condensation of an alpha-beta ethylenic acid or anhydride with a conjugated, unsaturated, nonhydroxylated fatty acid. The second type of reaction involves the condensation of an alpha-beta ethylenic acid or anhydride with a non-conjugated, unsaturated, nonhydroxylated fatty acid.

It is well known that maleic anhydride and other alpha-beta ethylenic acids or anhydrides will condense with conjugated, unsaturated fatty acids in accordance with Thiele's theory of 1-4 addition. The fatty acid in this case, of course, must contain at least two carbon-to-carbon double bonds and these must be conjugated. This type of reaction has been thoroughly studied by Diels and coworkers, and is often referred to as the Diels diene synthesis. The products are often called diene synthesis adducts.

Examples of suitable fatty acids which will take part in a Diels condensation include: Geranic acid, elaeostearic acid, 10, 12-octadecadienoic acid, tung oil fatty acids, etc. Actually, the esters of these acids, such as the triglycerides or the esters of mono-, di-, or other polyhydric alcohols may be employed in this condensation in place of the fatty acid itself. Examples of suitable esters include: methyl-10, 12-octadecadienoate, glycoldielaeostearate, oitacica oil, tung oil, dehydrated conjugated castor oil, ethyl dehydrogeranate and the like.

The alpha-beta ethylenic carboxy acids or anhydrides which are suitable for use in the aforementioned Diels diene synthesis for preparation of the present products are those containing less than ten carbon atoms and are exemplified by crotonic acid, maleic acid, fumaric acid, citraconic acid, glutaconic acid, acrylic acid, maleic anhydride, and citraconic anhydride.

Polybasic acids or anhydrides contemplated as reactants for production of this new class of compounds are also obtained by the condensation of an alpha-beta ethylenic acid, or anhydride with an unsaturated, non-conjugated, non-hydroxylated fatty acid containing from ten to twenty-four carbon atoms in the carbon chain. It has recently been shown by Clocker, U. S. Patents 2,188,882 to 2,188,892 inclusive, and Bickford et al., Oil and Soap, February, 1942, page 23 et seq., that such condensations may be brought about by heating the reactants at a suitable elevated temperature, usually above 200° C. and sometimes at temperatures above 300° C. The products formed are also acids or anhydrides, since the reaction appears not to involve the destruction of these groups. The alpha-beta ethylenic acids or anhydrides which are suitable for use in the aforementioned condensation with non-conjugated, unsaturated, non-hydroxylated fatty acids are those containing less than ten carbon atoms and are exemplified by crotonic acid, maleic acid, fumaric acid, citraconic acid, glutaconic acid, acrylic acid, maleic anhydride, and citraconic anhydride. Reference herein and in the claims to alpha-beta unsaturated acids is intended to include the anhydrides corresponding to such acids. Actually they are recognized as being functionally equivalent in condensations of the kinds herein contemplated.

Suitable non-conjugated, unsaturated, non-hydroxylated fatty acids for use in condensation reactions with the above-mentioned alpha-beta ethylenic acids are those containing from ten to twenty-four carbon atoms in their carbon chains, and include undecylenic acid, oleic acid, elaidic acid, linoleic acid, linolenic acid, etc.

For the production of the present compositions using as one reactant the above described condensation compounds of Clocker, I usually prefer to employ a condensation product derived from a glyceride containing, in esterified form, a large proportion of non-conjugated, unsaturated, non-hydroxylated fatty acid. Examples of such glycerides are olive oil, corn oil, cottonseed oil, linseed oil, rapeseed oil, perilla oil, cranberry seed oil, menhaden oil, cod oil, whale oil, heat bodied linseed oil, etc.

When glycerides or other esters of the non-conjugated, unsaturated, non-hydroxylated fatty acids are employed in the condensation reaction, the final product is not necessarily a polybasic acid or anhydride, since a monocarboxy, alpha-beta ethylenic acid, such as crotonic acid, may have been employed in the condensation. However, such monobasic acid condensation products are contemplated as reactants in preparing my new compositions; and they are intended to be included when reference is made to a polybasic carboxy acid or anhydride reactant. Actually they are the partial esters of dibasic acids and under certain conditions may function as polybasic acids by interchange of the alcohol residue with a hydroxyl-containing reactant.

My new compositions may be prepared by an esterification reaction between a diene synthesis adduct or a Clocker adduct and a high molecular weight alcohol. The alcohols contemplated are those containing an alkyl group of from eight to thirty-two carbon atoms, but in addition may contain other hydrocarbon groups or residues such as aromatic rings, alicyclic rings or even heterocyclic rings. The hydroxyl group may be attached either to the alkyl residue or to the non-alkyl portion of the molecule, but of course must be capable of forming an ester by reaction with the Clocker adduct. These alcohols may be either straight or branch chains and may be either primary, secondary, or tertiary, but are preferably primary or secondary, as such alcohols generally are more easily reacted with a minimum of side reactions to form the desired esters. Examples of suitable alcohol reactants include the following: n-octyl alcohol, 2-ethyl hexanol, lauryl alcohol, cetyl alcohol, octadecyl alcohol, ceryl alcohol, para-iso-octyl phenol, lauryl alcohol, 7-ethyl-2-methylundecanol-4, 3.9-diethyl tridecanol-6, dodecyl phenol, decylcyclohexanol, alcohols obtained by reduction of naphthenic acids, alcohols obtained by the hydrolysis of halogenated paraffin wax, alcohols obtained by the oxidation of high boiling petroleum fractions, and alcohols obtained by the reduction of synthetic acids resulting from the oxidation of Pennsylvania lubricating oil fractions.

Other suitable alcohols include the olefinic alcohols containing from eight to thirty-two carbon atoms and alcohols containing an olefinic residue of from eight to thirty-two carbon atoms. The presence of a double bond in the hydrocarbon chain does not appear to alter the usefulness of the effectiveness of the ester products, and for the purposes of the present invention the term "alkyl" as applied in describing suitable alcohols is intended to include olefinic residues which can be considered as being derived from an alkyl residue by dehydrogenation. Suitable olefinic alcohols include oleyl alcohol, undecenyl alcohol, hexadecenyl alcohol, eicosenyl alcohol, cardanol, and the like.

For convenience in describing the reactions involved in preparing the present products, the diene synthesis adducts and the Clocker adducts will be referred to simply as unsaturated fatty acid adducts, and this term is also intended to refer to adducts derived from the esters of the unsaturated fatty acids. In the examples it will be clear whether the adduct reactant employed is of the diene synthesis tape or the Clocker type. A mixture of the two may be employed, if desired.

In carrying out the synthesis of the present class of compounds, it is usually most convenient to prepare the desired adduct of the unsaturated fatty acid and an alpha-beta ethylenic acid, after which the desired high molecular weight alcohol is added and esterified by heating and stirring. It is not necessary that all of the carboxyls or potential (anhydride) carboxyls of the adduct be esterified with high molecular weight alcohols, and, as will be discussed hereinafter, some carboxyls will often be left unesterified.

The following examples illustrate the preparation of some of the present products:

*Example 1*

A diene synthesis adduct was first prepared by refluxing for four hours a mixture of one hundred and fifty lbs. of tung oil acids, fifty lbs. of maleic anhydride, one hundred lbs of benzol, and about twenty gms. of iodine.

To the above adduct in benzol was added one hundred and eighty-six lbs. of lauryl alcohol and refluxing was continued with a water trap under the condenser. After two hours refluxing, the benzol and water of reaction were slowly distilled off, leaving a viscous reddish oil.

*Example 2*

Tung oil was substituted for the tung oil acids in Example 1. The product in this case was quite soluble in kerosene and lubricating oil.

*Example 3*

Forty-two lbs of crotonic acid were substituted for the fifty lbs. of maleic anhydrided in Example 2, and only ninety-three lbs of lauryl alcohol were employed in the esterification step.

*Example 4*

A Clocker adduct was prepared by heating and stirring under an air condenser a mixture of three hundred lbs. of linseed oil and two hundred lbs. of citraconic anhydride. The temperature of this mixture was slowly raised to 230° C. and held at this point for two and one-half hours.

Fifty lbs. of the above adduct was heated and stirred in an open vessel with fifty lbs. of cetyl alcohol. The temperature was raised to 240° C. and held for forty-five minutes. The final product was a viscous oil, clearly soluble in kerosene and in lubricating oil.

*Example 5*

Maleic anhydride was substituted for the citraconic anhydride of Example 4.

*Example 6*

Methyl linolenate was substitued for the linseed oil of Example 4.

*Example 7*

Three hundred lbs. of soyabean oil and one hundred lbs. of maleic anhydride were heated with stirring under an air condenser. The temperature was gradually raised to 240° C. and held at this point for three hours.

Fifty lbs. of the above adduct and thirty-five lbs. of oleyl alcohol were heated and stirred in an open vessel for one hour at a temperature of 250° C. The product was a viscous oil.

Example 8

Octylcyclohexanol was substituted for oleyl alcohol in Example 7.

Example 9

Eight hundred and eighty lbs. of linseed oil and six hundred and seventy-two lbs. of citraconic anhydride were reacted as in Example 4 to form an adduct. After cooling the above product, eight hundred and ten lbs. of commercial stearyl alcohol were added to the reaction vessel. The temperature was raised to 250° C. and held at that point for three hours. A small amount of water was evolved through a take-off condenser.

For the preparation of rust preventive compounds, various products of the above examples may be used directly as such for application to the metal to be protected or may be mixed with a suitable solvent or carrying agent for application as a slushing oil or grease. These products may be used alone or in mixtures with other rust preventive reagents. Examples of such rust preventive compositions are given below:

RUST PREVENTIVE COMPOUNDS

Example A

The following reagents were mixed with slight warming until clear and homogeneous:

| | Pounds |
|---|---|
| Product of Example 4 | 100 |
| Monoamyl amine | 9 |
| Viscous lubricating oil (6000 S. U. S. at 100° F.) | 250 |
| Mineral spirits | 700 |

This compound is a thin, rust preventive oil suitable for dipping, brushing or spraying.

Example B

The following were blended as in Example A:

| | Pounds |
|---|---|
| Product of Example 5 | 100 |
| Dibutyl amine | 12 |
| Mineral pitch | 50 |
| Blown soyabean oil | 50 |
| Oil soluble petroleum sulfonate | 25 |
| Mineral spirits | 600 |

This product forms thin, adherent, slightly tacky, rust-preventive films which are readily removable in hot water.

Example C

The product of Example 7 was substituted for the product of Example 5 in Example B, and the dibutyl amine was omitted.

Example D

The following were warmed and stirred until homogeneous; the mixture was then filtered to remove the small amount of undissolved impurities:

| | Pounds |
|---|---|
| Product of Example 9 | 123 |
| Oil soluble petroleum sulfonate | 25 |
| Viscous lubricating oil | 150 |
| Mineral spirits | 700 |

Example E

The following were mixed and filtered as in Example D:

| | Pounds |
|---|---|
| Product of Example 9 | 180 |
| Cyclohexylamine | 8 |
| Petroleum pitch | 100 |
| Petrolatum | 50 |
| Carbon tetrachloride | 600 |

This product gives a quick drying film of sufficient color to be seen on the metal surface.

Example F

The following were treated as in Example D:

| | Pounds |
|---|---|
| Product of Example 9 | 123 |
| Cyclohexylamine | 5 |
| Viscous mineral oil (6000 S. U. S. at 100° F.) | 250 |
| Kerosene | 625 |

Heavy, grease-like rust preventives may be prepared by blending the present compounds with petrolatum, or mixtures of petrolatum and other ingredients such as natural or synthetic resins, rubber, etc.

In some of the examples given above less alcohol has been used in the esterification reaction than corresponds to all of the available carboxyls present in the adduct. Any unreacted carboxylic acid or anhydride groups may be left as such or may be neutralized with ammonia, amines, or inorganic bases, in which case the acidic hydrogen is replaced with an amino, ammonium, or metal ion. Examples B, C, D, E and F above illustrate the use of an amine for neutralizing part of the available carboxyl groups of the adduct ester. It is in many instances unnecessary to neutralize all such free carboxyls and for certain uses this may be undesirable. In some cases where a rust preventive compound is to be applied in aqueous solution it is desirable to neutralize the carboxyl groups of the acidic adduct ester with inorganic bases, ammonia or low molecular weight amines in order to impart water solubility or water dispersibility on the reagent.

As pointed out in my above-mentioned Patent No. 2,342,113, the present compositions have uses in various other arts and are there claimed particularly as additives for lubricating oil.

Products having detergent and sludge dispersing properties may be prepared, for example, by treating the product of Example 4 with calcium hydroxide, to neutralize free carboxy acid groups, heating to complete the reaction and drive off water, dissolving in ligroin, filtering to remove unused calcium hydroxide, and evaporating ligroin from the filtrate.

Similar products may be prepared from the compounds of the other examples where free anhydride or carboxyl groups are present.

If desired, residual carboxy acid groups may be esterified with low molecular weight alcohols to yield products with improved oil solubility.

The present reagents may also be used as break inducers in the Doctor sweetening process, and for such use may be applied as described in U. S. Patent 2,208,505 to Blair and Boydstun.

Residual carboxy acid groups may be reacted with phenols, for example, phenol, catechol, pyrogallol, etc., to yield products with antioxidant properties. Amino phenols such as para-amino phenol or ortho-amino phenol may be used either to neutralize carboxyls or to esterify or amidify them, thus giving compounds of improved antioxidant properties.

Recapitulating, the acidic hydrogens which may remain in the present class of chemical reagents may be left as such or may be replaced by any equivalent. Such acidic products may be treated with a suitable alkaline material such as caustic soda, caustic potash, ammonium hydroxide, calcium hydroxide, magnesium hydroxide, etc., to form the corresponding metallic salts, or with amines such as amylamine, cyclohexylamine, triethanolamine, para amino phenol, etc., to form the amine salts. The acidic hydrogen may be replaced by a lower alcohol residue derived from alcohols such as ethanol, butanol, hexanol, cyclohexanol, phenol, catechol, etc., to form an ester. Amino alcohols such as the ethanolamines, glyceryl amines, etc., may be employed to replace an acidic hydrogen either by esterification or salt formation.

The present class of chemical products appears to have its greatest usefulness in the field of lubricating oil additives and rust preventives. They are also effective in modifying a crystalline form of wax, for dispersing sludge accumulations in oil, for increasing oiliness and load bearing capacity of oils and for various other uses. Most of these useful properties appear to be related to the surface activity of the compounds or their ability to adsorb strongly on metallic or other surfaces.

It will be obvious to most chemists that various derivatives of the present products may be prepared which will have similar properties. For example, many of the present products contain carbon-to-carbon double bonds, either in the fatty acid or alcohol chain, and may be readily sulfurized by heating with sulfur. Such sulfurized derivatives, in some instances, have valuable properties over and above the original unsulfurized product. For example, they usually are better antioxidants and have greater film strength as lubricants.

Other obvious derivatives include those derivable by oxidation, as by blowing with air or oxygen at elevated temperatures, and polymerized products derivable by reacting carboxyl or anhydride containing compositions with polyhydric alcohols or polyamines.

Having described my invention, I claim:

1. The monohydric alcohol ester of an acidic adduct which is an acyclic alpha-beta unsaturated acid having not over ten carbon atoms, combined at an intermediate point in the carbon atom chain of a non-hydroxylated unsaturated fatty acid radical having at least eight and not more than thirty-two carbon atoms; said radical being an integral part of a compound selected from the class consisting of esters and acids; said alcohol containing at least one alkyl hydrocarbon radical having at least eight and not more than thirty-two carbon atoms.

2. The monohydric alcohol ester of an acidic adduct which is an acyclic polybasic alpha-beta unsaturated acid having not over ten carbon atoms, combined at an intermediate point in the carbon atom chain of a non-hydroxylated unsaturated fatty acid radical having at least eight and not more than thirty-two carbon atoms; said radical being an integral part of a compound selected from the class consisting of esters and acids; said alcohol containing at least one alkyl hydrocarbon radical having at least eight and not more than thirty-two carbon atoms.

3. The monohydric alcohol ester of an acidic adduct which is an acyclic polybasic alpha-beta unsaturated acid having not over ten carbon atoms, combined at an intermediate point in the carbon atom chain of a non-hydroxylated polyethylenic fatty acid radical having at least eight and not more than thirty-two carbon atoms; said radical being an integral part of a compound selected from the class consisting of esters and acids; said alcohol containing at least one alkyl hydrocarbon radical having at least eight and not more than thirty-two carbon atoms.

4. The monohydric alcohol ester of an acidic adduct which is an acyclic polybasic alpha-beta unsaturated acid having not over ten carbon atoms, combined at an intermediate point in the carbon atom chain of a non-hydroxylated polyethylenic fatty acid radical having eighteen carbon atoms; said radical being an integral part of a compound selected from the class consisting of esters and acids; said alcohol containing at least one alkyl hydrocarbon radical having at least eight and not more than thirty-two carbon atoms.

5. The monohydric alcohol ester of an acidic adduct which is an acrylic polybasic alpha-beta unsaturated acid having not over ten carbon atoms, combined at an intermediate point in the carbon atom chain of a non-hydroxylated polyethylenic, vegetable fatty acid radical having eighteen carbon atoms; said radical being an integral part of a compound selected from the class consisting of esters and acids; said alcohol containing at least one alkyl hydrocarbon radical having at least eight and not more than thirty-two carbon atoms.

6. The monohydric aliphatic alcohol ester of an acidic adduct which is an acyclic polybasic alpha-beta unsaturated acid having not over ten carbon atoms, combined at an intermediate point in the carbon atom chain of a non-hydroxylated polyethylenic vegetable fatty acid radical having eighteen carbon atoms; said radical being an integral part of a compound selected from the class consisting of esters and acids; said alcohol containing at least one alkyl hydrocarbon radical having at least eight and not more than thirty-two carbon atoms.

7. The monohydric aliphatic alcohol ester of an acidic adduct which is an acyclic polybasic alpha-beta unsaturated acid having not over ten carbon atoms, combined at an intermediate point in the carbon atom chain of a polyethylenic vegetable fatty acid radical having eighteen carbon atoms; said radical being an integral part of a compound selected from the class consisting of esters and acids; said alcohol containing at least one alkyl hydrocarbon radical having at least eight and not more than thirty-two carbon atoms; at least one long carbon atom chain being attached to the same carbon atom to which the hydroxyl group is attached.

8. The lauryl alcohol ester of an acidic adduct which is an acyclic polybasic alpha-beta unsaturated acid having not over ten carbon atoms, combined at an intermediate point in the carbon atom chain of a non-hydroxylated polyethylenic vegetable fatty acid radical having eighteen carbon atoms; said radical being an integral part of a compound selected from the class consisting of esters and acids.

9. The octadecyl alcohol ester of an acidic adduct which is an acyclic polybasic alpha-beta unsaturated acid having not over ten carbon atoms, combined at an intermediate point in the carbon atom chain of a non-hydroxylated polyethylenic vegetable fatty acid radical having eighteen carbon atoms; said radical being an integral part of a compound selected from the class consisting of esters and acids.

10. The cetyl alcohol ester of an acidic adduct which is an acyclic polybasic alpha-beta unsaturated acid having not over ten carbon atoms, combined at an intermediate point in the carbon atom chain of a non-hydroxylated polyethylenic vegetable fatty acid radical having eighteen carbon atoms; said radical being an integral part of a compound selected from the class consisting of esters and acids.

CHARLES M. BLAIR, JR.

REFERENCES CITED

The following references are of record in the file of this patent:

UNITED STATES PATENTS

| Number | Name | Date |
| --- | --- | --- |
| 2,188,882 | Clocker | Jan. 30, 1940 |
| 2,275,843 | Clocker | Mar. 10, 1942 |
| 2,312,732 | Salathiel | Mar. 2, 1943 |